US012172432B2

(12) United States Patent
Noh

(10) Patent No.: US 12,172,432 B2
(45) **Date of Patent: *Dec. 24, 2024**

(54) INTEGRATED CARTRIDGE AND PRINTER USING THE SAME

(71) Applicant: PRINICS CO., LTD., Suwon-Si (KR)

(72) Inventor: Kwang-Ho Noh, Suwon-Si (KR)

(73) Assignee: PRINICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,458

(22) Filed: Nov. 28, 2022

(65) Prior Publication Data

US 2023/0092583 A1 Mar. 23, 2023

Related U.S. Application Data

(60) Continuation of application No. 17/322,847, filed on May 17, 2021, now Pat. No. 11,511,555, which is a division of application No. 16/167,480, filed on Oct. 22, 2018, now Pat. No. 11,034,174.

(51) Int. Cl.

| | |
|---|---|
| ***B41J 17/32*** | (2006.01) |
| ***B41J 2/325*** | (2006.01) |
| ***B41J 13/03*** | (2006.01) |
| ***B41J 13/10*** | (2006.01) |
| *B41J 11/04* | (2006.01) |
| *B41J 33/16* | (2006.01) |

(52) U.S. Cl.

CPC ............... *B41J 17/32* (2013.01); *B41J 2/325* (2013.01); *B41J 13/03* (2013.01); *B41J 13/103* (2013.01); *B41J 11/04* (2013.01); *B41J 33/16* (2013.01)

(58) Field of Classification Search

CPC . B41J 2/325; B41J 11/04; B41J 13/103; B41J 13/03; B41J 17/32; B41J 33/16

See application file for complete search history.

(56) References Cited

U.S. PATENT DOCUMENTS 5,230,574 A * 7/1993 Namekawa .............. B41J 17/32 400/120.16
5,296,874 A 3/1994 Nagata et al.
6,069,642 A * 5/2000 Isobe .................. B41J 13/0081 347/214
6,504,564 B1 1/2003 Funaki et al.
6,522,349 B1 2/2003 Lee (Continued)

FOREIGN PATENT DOCUMENTS

EP 0666181 A1 * 8/1995 ............. B41J 35/22
KR 10-2007-0090760 A 9/2007

(Continued)

OTHER PUBLICATIONS blog.naver.com/purehwayoung/220531004671, Nov. 6, 2015. mobile photo printer.

*Primary Examiner* — Jill E Culler

(74) *Attorney, Agent, or Firm* — Goldilocks Zone IP Law

(57) ABSTRACT

An integrated cartridge is provided, which includes a printing medium receiving groove in which a printing medium is loaded; a feeding mounting hole and a take-up bobbin mounting hole are formed; a feeding bobbin mounted in the feeding bobbin mounting hole; a take-up bobbin mounted in the take-up bobbin mounting hole; and a first opening disposed between the feeding bobbin and the take-up bobbin configured to draw out the printing medium.

20 Claims, 11 Drawing Sheets

(56) References Cited

U.S. PATENT DOCUMENTS

| | | | | |
|---|---|---|---|---|
| 7,436,419 | B2 * | 10/2008 | Ogawa | B41J 13/103 400/208 |
| 2004/0233267 | A1 | 11/2004 | Silverbrook | |

FOREIGN PATENT DOCUMENTS

| | | | |
|---|---|---|---|
| KR | 10-0883296 | B1 | 2/2009 |
| KR | 10-1056677 | B1 | 8/2011 |
| KR | 10-2015-0088402 | A | 8/2015 |
| KR | 10-2017-0101074 | A | 9/2017 |

* cited by examiner

INTEGRATED CARTRIDGE AND PRINTER USING THE SAME

CROSS REFERENCE TO RELATED PATENT APPLICATIONS

This application is a continuation application of a U.S. patent application Ser. No. 17/322,847 filed on May 17, 2021, which is a divisional application of U.S. patent application Ser. No. 16/167,480 filed on Oct. 22, 2018, the disclosures of which are incorporated herein in their entirety by reference.

TECHNICAL FIELD

The present invention relates to an integrated cartridge and a printer using the same.

More specifically, a printing medium and a feeding bobbin and a take-up bobbin are installed together.

The present invention relates to an integrated cartridge in which a printing medium, printing paper, having a discharge port is provided between a feeding bobbin and a take-up bobbin, and a printer using the same thereof.

BACKGROUND

As is well known, a thermal transfer printer refers to a printer in which heat is applied to a thermal transfer ribbon applied with a dye so that the dye on the thermal transfer ribbon is transferred to the printing medium and fixed on it.

Such a thermal transfer printer is classified into a sublimation type thermal transfer method in which a dye is transferred under sublimation and a melting type thermal transfer method in which the dye is transferred by being melted by the thermal print head.

FIG. 1 is a view showing a cartridge of a thermal transfer printer according to the related art.

The cartridge may include an upper case 10 for loading the printing medium, paper sheets 13, a lower case 11 for mounting the ink sheet 12, a feeding housing 20 for mounting the ink sheet 12 before printing, a take-up housing 21 for winding the ink sheet after printing, and a discharge port 30 adjacent to the feeding housing 20 for discharging the printing medium one by one.

One end of the ink sheet 12 is connected to the first bobbin 12*a* and the other end of the ink sheet 12 is connected to the second bobbin 12*b*. Both ends of the ink sheet 12 are attached to the bobbins by adhesion or the like. The ink sheet 12 is wrapped around the first bobbin 12*a* and the first bobbin 12*a* is installed at the feeding housing 20. Further, the second bobbin 12*b* is installed at the take-up housing 21.

The printing medium 13 is loaded in the printing medium housing 22 of the upper case 10. A protective sheet 14 is provided to prevent the printing medium 13 from being dirtied or damaged. A space 33 is formed between the ink sheet 12 and the printing sheet 13 to allow the thermal print head unit to be positioned when the cartridge is loaded in the printer. An opening 34 is provided at the middle upper case 10, which is located between the feeding housing 20 and the take-up housing 21.

An opening 34 is provided in the upper middle case 10 between the feeding housing 20 and the take-up housing 21.

However, in the conventional cartridge according to the related art, the feeding unit including the recording sheet and the ink sheet before printing, and the take-up unit for taking-up the ink sheet after printing are formed in one cartridge.

Because the opening for withdrawing recording sheet is formed on one side of the cartridge, there is difficulty in reducing the overall thickness of the cartridge.

In addition, the conventional cartridge is structured such that the ink sheet housing and the printing medium housing are formed separately and are formed into a single body using separate coupling means, which complicates the manufacturing process and increases the manufacturing cost.

CITED REFERENCES

Patent Literature

Korean Patent Registration No. 10-1056677, titled “cassette for printer,” Issued on Aug. 8, 2011.

DESCRIPTION

Problem to be Solved

To solve the problem, in the present invention, the printing sheet, printing medium, the feeding bobbin, and the take-up bobbin are installed together and a printer using the above features and a cartridge including a printing medium discharge port located between the feeding bobbin and a take-up bobbin is provided.

Solution to the Problems

According to an aspect of the present invention, a printing apparatus may include a cartridge housing including a printing medium receiving groove in which a printing medium is loaded, a feeding bobbin mounting hole, and a take-up bobbin mounting hole formed therein.

According to an aspect of the present invention, a printer, the printer including: a pick-up roller; a capstan roller; a platen roller; and a cartridge, wherein the cartridge includes: a cartridge housing, which includes a printing medium receiving groove in which the printing medium is loaded;

a feeding bobbin on which a ribbon is wound, a take-up bobbin for winding up the ribbon, a first opening accommodated between the feeding bobbin and the take-up bobbin for guiding the printing medium to sequentially feed from a top stacked printing medium to pass between the feeding bobbin and the take-up bobbin therethrough; and a cam unit configured to install at a lower portion of the printer to pass the printing medium through the first opening by loading the pick-up roller if the cartridge is loaded, and to print the printing medium by loading the platen roller.

Thus, the cartridge may have a feeding bobbin mounted in the feeding bobbin mounting hole and a take-up bobbin provided in the take-up bobbin mounting hole, wherein the cartridge housing has a first opening formed between the feeding bobbin and the take-up bobbin so that the printing medium is drawn out.

In addition, a lower portion of the printing medium receiving groove is opened so that the printing medium is inserted from the lower portion of the printing medium receiving groove for loading.

In addition, the first opening may include a stepped portion having a predetermined height formed at a distal end of which the printing medium is discharged.

The cartridge housing according to an aspect of the present invention may further include an ink sheet guide provided between the feeding bobbin mounting hole and the take-up bobbin mounting hole to guide the ink sheet drawn out from the feeding bobbin to the take-up bobbin to be wound.

Further, the integrated cartridge may further include a sheet for supporting and protecting the printing medium mounted in the printing medium receiving groove according to an aspect of the present invention.

Further, the integrated cartridge according to the present invention may further include a bobbin cover to cover the feed bobbin.

The bobbin cover may include a second opening formed between a lower portion of the feeding bobbin and an upper portion of the printing medium receiving groove to allow the printing medium to pass therethrough according to an aspect of the present invention.

A bobbin cover may further include a bobbin cover guide is accommodated to one side of the bobbin cover housing for guiding the printing medium to pass between a lower portion of the feeding bobbin and an upper portion of the printing medium receiving groove according to an aspect of the present invention.

A stepped portion may be formed on the other side of the bobbin cover housing at a predetermined distance from an upper surface of the printing medium receiving groove according to an aspect of the present invention.

The integrated cartridge may sequentially feed and output the printing medium accommodated in the cartridge from a top of the printing medium to the first opening according to an aspect of the present invention.

According to another aspect of the present invention, there is provided a printing apparatus including: a cartridge housing having a printing medium receiving groove in which a printing medium is loaded; the cartridge housing having a feeding bobbin mounting hole and a take-up bobbin mounting hole; a feeding bobbin provided in the feeding bobbin mounting hole; and a take-up bobbin provided in the take-up bobbin mounting hole, wherein the feeding bobbin is provided on an upper portion of the printing medium receiving groove.

A printing apparatus may include a cartridge housing having a printing medium receiving groove in which a printing medium is mounted, a feeding bobbin mounting hole, and a take-up bobbin mounting hole are formed thereof.

The feeding bobbin provided in the feeding bobbin mounting hole, and a take-up bobbin provided in the take-up bobbin mounting hole.

A cartridge formed with a first opening formed between the feeding bobbin and the take-up bobbin therethrough the printing medium is output.

The cam may load the capstan roller, the pinch roller, and the platen roller so that the outputted printing medium is printed when the cam portion loads a printing medium lift and the pick-up roller and the printing medium is output through the first opening.

According to an aspect of the present invention, the outputted printing medium is printed by reciprocating movement of the capstan roller and the pinch roller caused by the forward and backward rotation within the printer.

In addition, a coating layer may be further formed on a surface of the printing medium according to an aspect of the present invention.

According to an aspect of the present invention, a printer, which may include: a pick-up roller; a capstan roller; a platen roller; and an integrated cartridge, wherein the integrated cartridge includes: a cartridge housing having a printing medium receiving groove in which a printing medium is loaded, a feeding mounting unit and a take-up bobbin mounting unit are formed, a feeding bobbin mounted in the feeding bobbin mounting unit, a take-up bobbin mounted in the take-up bobbin mounting unit, and a first opening disposed between the feeding bobbin and the take-up bobbin configured to draw out the printing medium; and a cam unit configured to load the pickup roller for printing the printing medium received through the first opening by loading the pickup roller when the integrated cartridge is loaded and to print the printing medium by loading the capstan roller.

According to an aspect of the present invention, a printer, which may include capstan roller and the pickup roller are configured to rotate forward and/or backward the printing medium is reciprocated and printed inside the printer by forward rotation and reverse rotation.

According to an aspect of the present invention, a printer is configured to form a coating layer on a surface of the printing medium when the printing is finished and discharges.

According to an aspect of the present invention, a printer may include a feeding mounting unit is in a form of a hole and the take-up bobbin mounting unit is in a form of a hole.

According to an aspect of the present invention, a printer may include a take-up bobbin mounting hole, which is disposed on the left side of the first hole and a feeding bobbin mounting hole, which is disposed on a right side of the first opening.

According to an aspect of the present invention, a printer may include an ink sheet guide provided between the feeding to guide the ink sheet drawn out from the feeding bobbin to be moved and wound to the take-up bobbin.

According to an aspect of the present invention, a printer, the printer including: a pick-up roller; a capstan roller; a platen roller; and an integrated cartridge, wherein the integrated cartridge includes: a cartridge housing having a printing medium receiving groove in which a printing medium is loaded, a feeding mounting unit and a take-up bobbin mounting unit are formed, a feeding bobbin mounted in the feeding bobbin mounting unit, a take-up bobbin mounted in the take-up bobbin mounting unit, and a first opening disposed between the feeding bobbin and the take-up bobbin configured to draw out the printing medium; and a cam unit configured to load the pickup roller for printing the printing medium received through the first opening by loading the pickup roller when the integrated cartridge is loaded and to print the printing medium by loading the capstan roller.

According to an aspect of the present invention, a printer, the printer may include an ink sheet guide provided between the feeding bobbin mounting hole and the take-up bobbin mounting hole and configured to guide the ink sheet drawn out from the feeding bobbin to be moved and wound to the take-up bobbin.

Effects of the Invention

According to aspect of the present invention, a printing medium, a feeding bobbin and a winding bobbin are installed together, and a printing medium discharge port located between the feeding bobbin and a take-up bobbin is provided, thus overall the depth of the cartridge may be reduced.

There is an advantage to the overall thickness of the cartridge can be reduced by providing the printing medium outlet between the feeding bobbin and the take-up bobbin.

Further, the present invention is advantageous in that it can be simplify the assembling process by configuring the bobbin so that the bobbins can be directly inserted into the cartridge housing, thereby reducing the manufacturing cost.

DETAILED DESCRIPTIONS OF THE INVENTION

Hereinafter, preferred embodiments of the integrated cartridge according to an aspect of the present invention will be described in detail with reference to the accompanying drawings.

Figure 1:
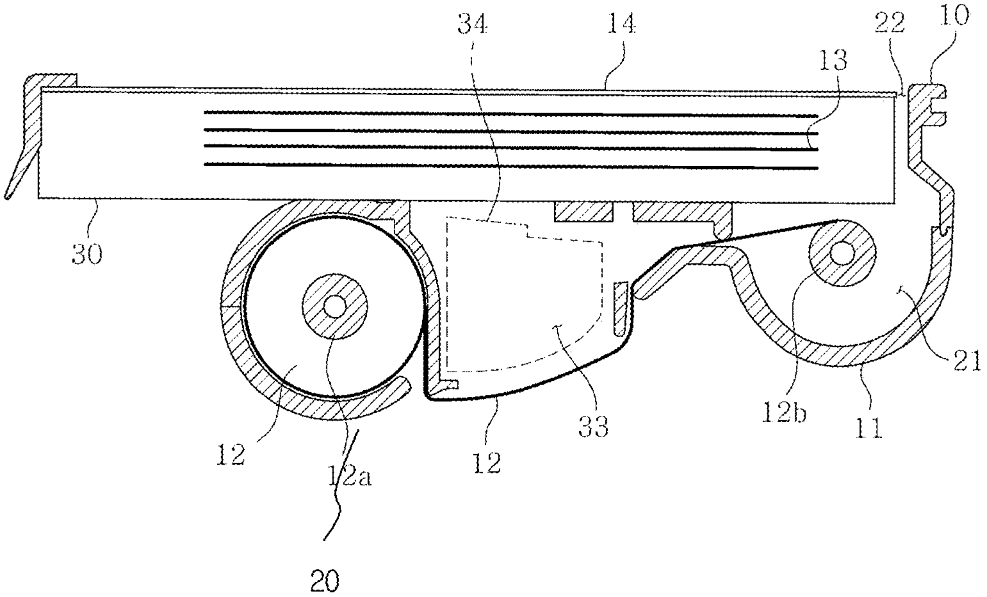
FIG.1(Prior Art)
FIG. 1 is an exemplary view showing a cartridge of a thermal transfer printer according to the related art.
Figure 2:
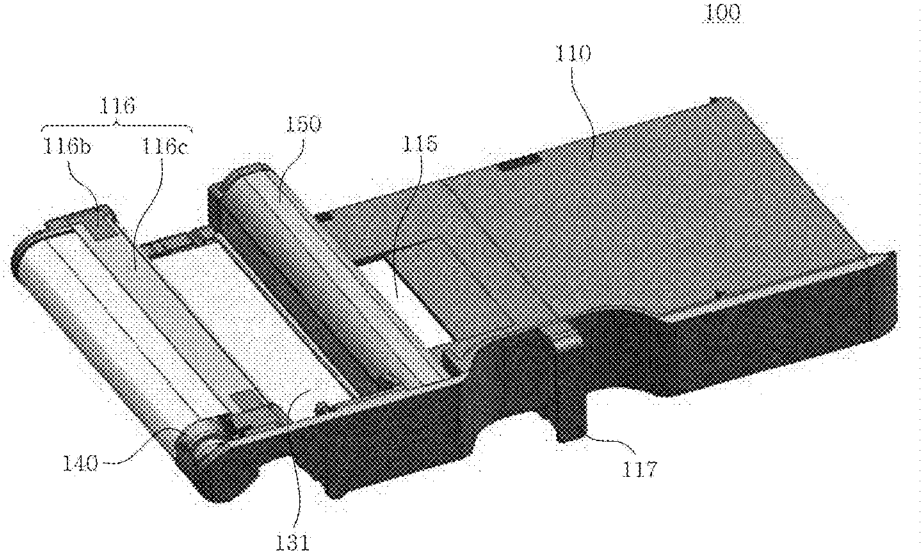
FIG. 2 is a perspective view of an integrated cartridge according to an aspect of the present invention.
Figure 3:
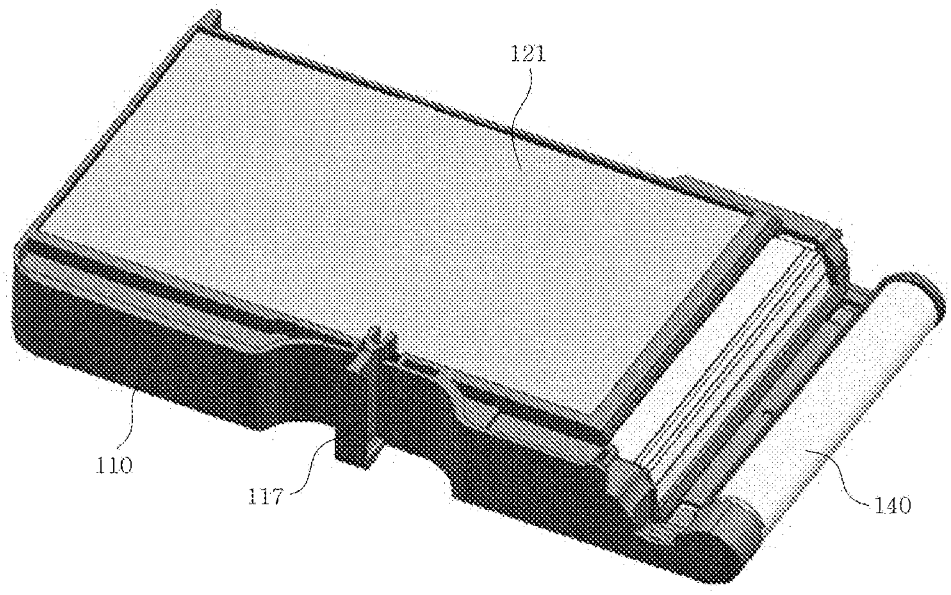
FIG. 3 is a perspective view showing the back side of the integrated cartridge according to an aspect of the present invention.

FIG. 2 is a perspective view showing the integrated cartridge according to an aspect of the present invention, FIG. 3 is a perspective view showing the rear side of the integrated type cartridge according to an aspect of the present invention.

Figure 4:
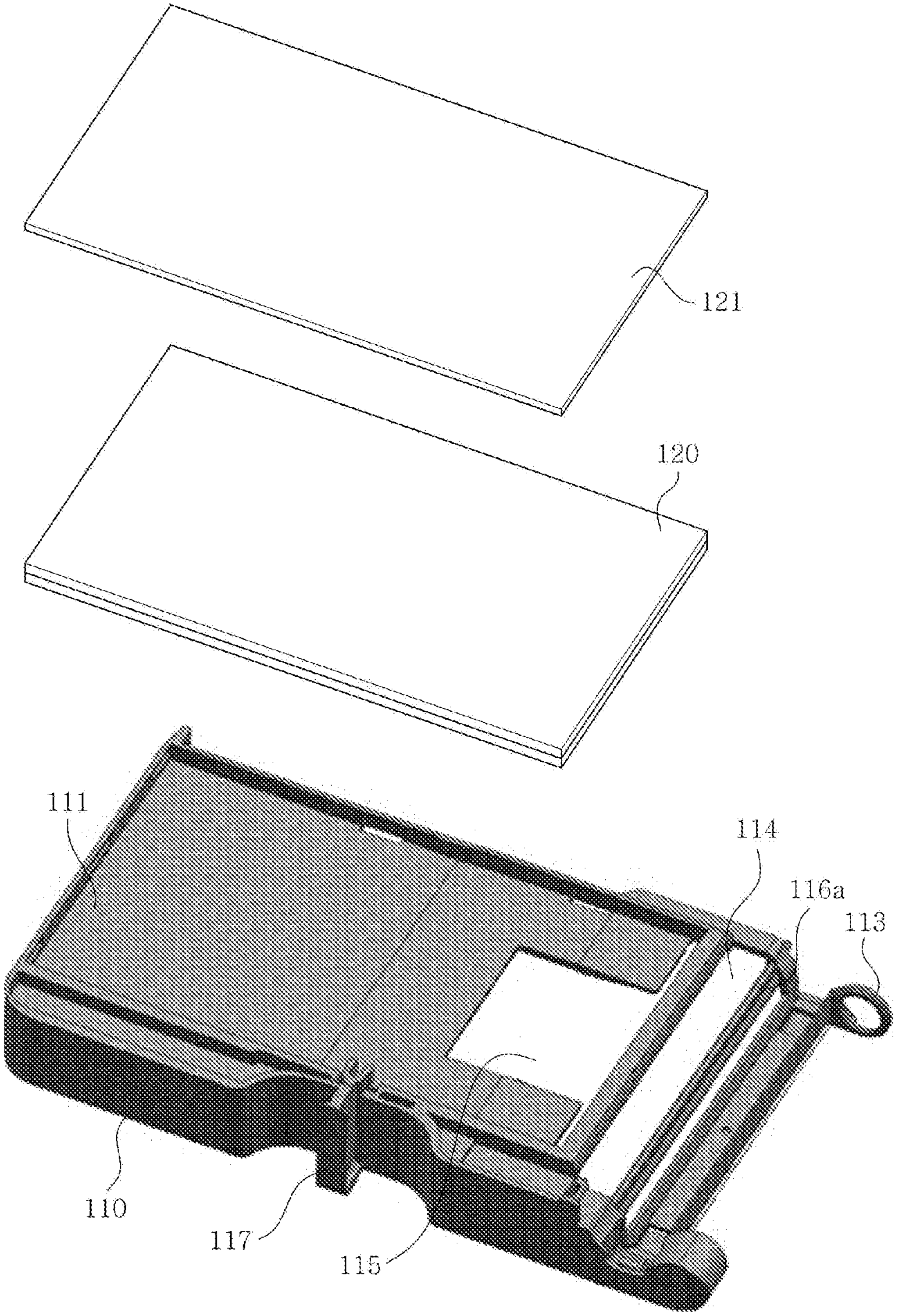
FIG. 4 is an exploded perspective view of backside of the integrated cartridge rear configuration of FIG. 3.

FIG. 4 is an exploded perspective view showing the integrated cartridge rear structure of FIG. 3.

Figure 5:
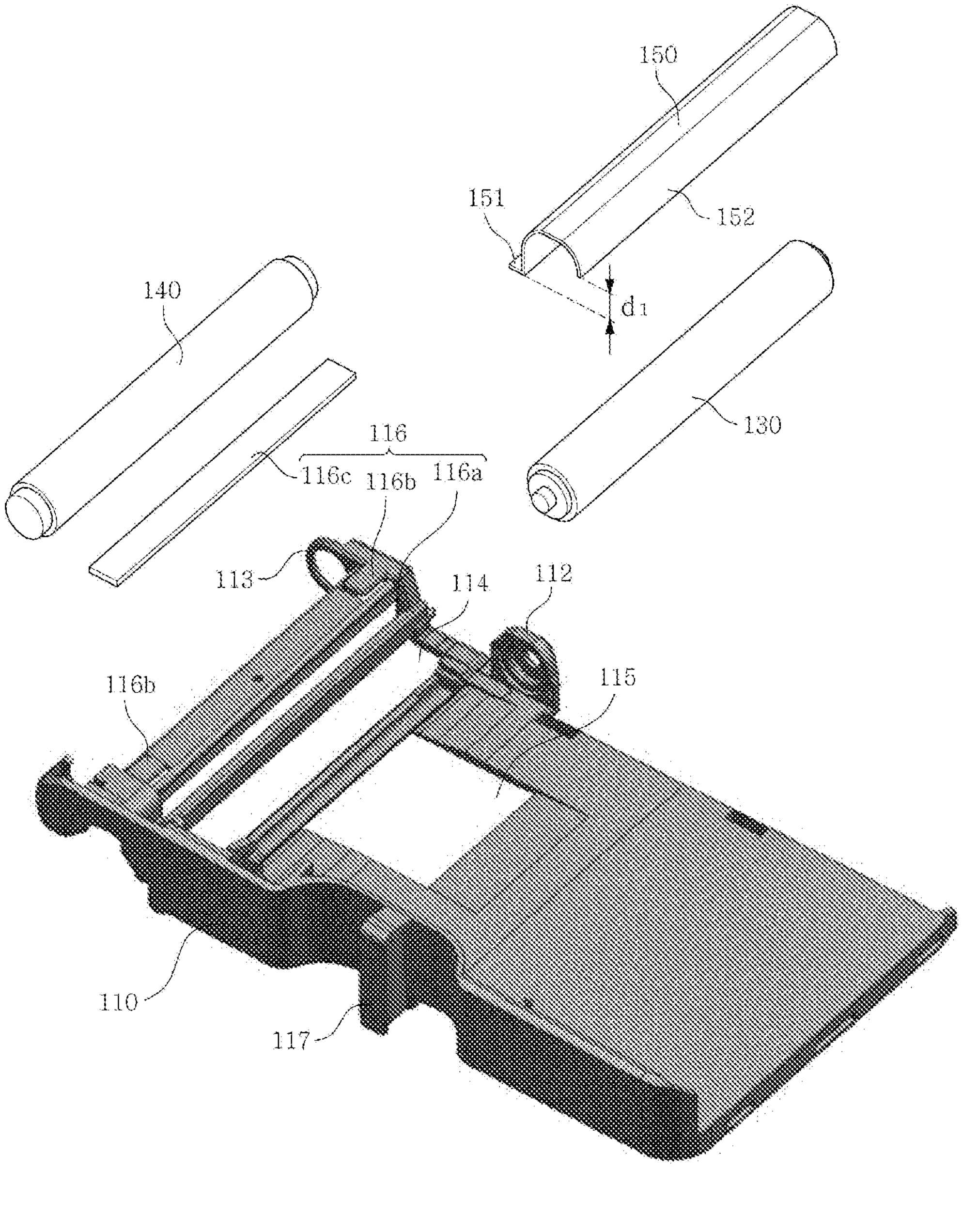
FIG. 5 is an exploded perspective view of the main part of the integrated cartridge according to an aspect of the present invention.
Figure 6:
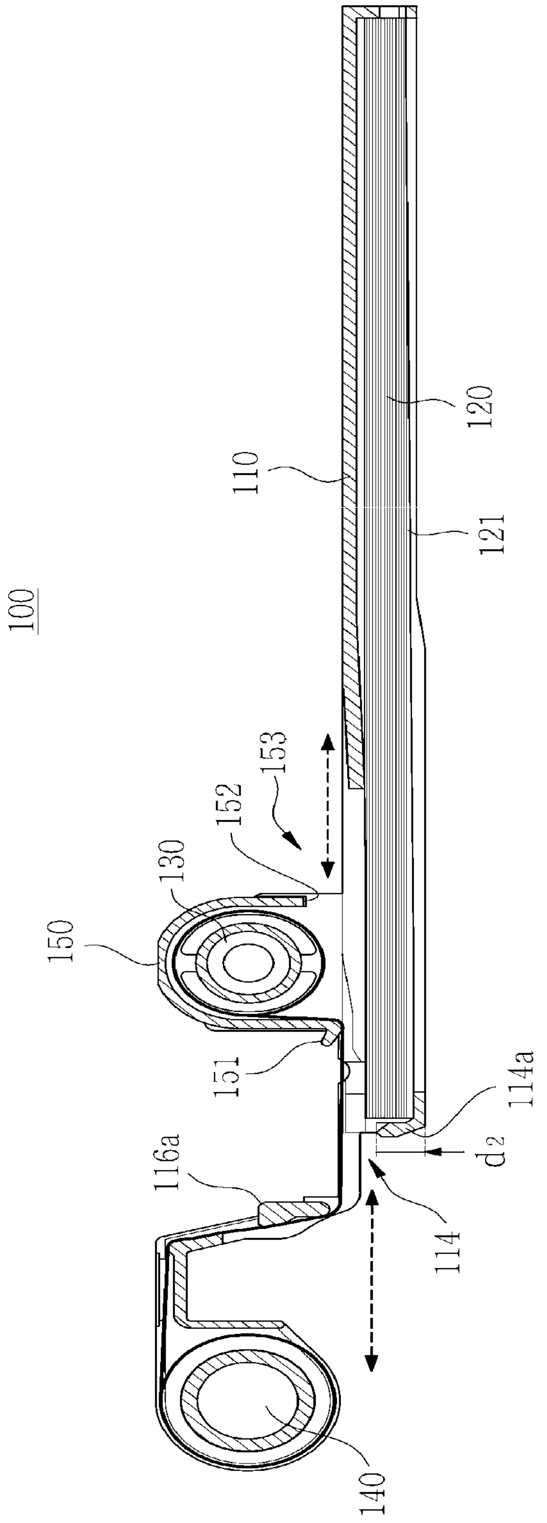
FIG. 6 is a sectional view showing the structure of the integrated cartridge according to an aspect of the present invention.

FIG. 5 is an exploded perspective view of a main part of the integrated cartridge according to an aspect of the present invention;

FIG. 6 is a cross-sectional view showing the structure of the integrated cartridge according to an aspect of the present invention.

FIGS. 2 to 6, the integrated cartridge 100 may include a cartridge housing 110, a feeding bobbin 130, a take-up bobbin 140, a bobbin cover 150, and/or a printing medium 120 according to an aspect of the present invention.

The cartridge housing 110 may include a printing medium receiving groove 111 in which the printing medium 120 is loaded, a feeding bobbin mounting hole 112 for rotatably supporting the feeding bobbin 130, and a take-up bobbin mounting hole 113 for rotatably supporting the take-up bobbin 140 is provided.

In addition, the cartridge housing 110 is provided with the first opening 114 to pass printing medium 120 therethrough loaded in the printing medium receiving groove 111. The first opening 114 may be formed between the feeding bobbin 130 and the take-up bobbin 140 according to an aspect of the present invention.

That is, on the left side (or front side) of the first opening 114, the take-up bobbin mounting hole 113 is disposed on the left side or front side of the first opening 114 and the take-up bobbin 140 is mounted in the take-up bobbin mounting hole 113.

A feeding bobbin mounting hole 113 may be formed in the upper portion of the printing medium receive groove 111 on the right side (or rear side) of the first opening 114 so that the feeding bobbin 130 may be mounted using the feeding bobbin mounting hole 113.

In addition, the printing-medium receiving groove 111 may be not provided in the lower portion of the take-up bobbin 140.

Further, the printing medium receiving groove 111 is configured such that the lower portion is opened, and the printing medium 120 is inserted in the opened lower portion.

In addition, the first opening 114 is formed with a step portion **114*a* having a predetermined height at the end where the printing medium 120** is discharged according to an aspect of the present invention.

The first opening 114 may be accommodated between the feeding bobbin 130 and the take-up bobbin 140 and a height d2 of the first opening 114 is about 0.3 mm or less.

The cartridge housing 110 is also configured such that the pickup roller 230 contacts the printing medium 120 loaded in the printing medium receiving groove 111 to pick up or draw the printing medium 120 from the printing medium receiving groove 111.

A pickup roller insertion port 115 may be provided on the upper surface of the printing medium receiving groove 111 so that the printing medium receiving groove 111 is opened.

The pick-up roller 230 may sequentially pick up and send out the printing medium 120 loaded in the printing medium receiving groove 111 to the first opening 114.

The cartridge housing 110 may further include an ink sheet guide 116 which is mounted between the feeding bobbin mounting hole 112 and the take-up bobbin mounting hole 113 and draw out the ink sheet 131 from the feeding bobbin 130 and guide the ink sheet 131 to the take-up bobbin 140.

Thus, the ink sheet guide 116 may guide the ink sheet 131 to be moved and wound.

The ink sheet guide 116 may include a first guide **116*a*, a second guide 116*c*, and a guide groove 116*b*** according to an aspect of the present invention.

The first guide **116*a* may guide the ink sheet 131 to be moved in a vertical direction, which is drawn out from the feeding bobbin 130 and moved in a horizontal direction, wherein the first guide 116*a* is provided around the take-up bobbin mounting hole 113, and a second guide 116*c* for guiding the vertical movement of the ink sheet 131 to the take-up bobbin 140 and a second guide 116*c* for guiding the ink sheet 131 to be wound on the take-up bobbin mounting hole 113**.

The guide groove **116*b* may support the second guide 116*c* to be fixed on a portion of the take-up bobbin mounting hole 113**.

The cartridge housing 110 may have a handle 117 formed at one side thereof so that the user can grip the cartridge housing 110 and insert the cartridge into the printer 200 or draw the cartridge from the printer 200.

The printing medium 120 may be a printing paper having a predetermined size and is made of any one of a paper material and a synthetic resin material.

A plurality of printing media 120 are sequentially stacked and loaded in the printing medium receiving groove 111.

In addition, the integrated cartridge 100 may further include a sheet paper 121, which is installed in the printing medium receiving groove 111 with the bottom opened so that the printing medium 120 loaded in the printing medium receiving groove 111 can be protected without being exposed and supporting the printing medium 120 to prevent the printing medium 120 from being sagged downward.

The feeding bobbin 130 may be mounted in the feeding bobbin mounting hole 112 to feed the ink sheet 131 in the printing process.

The take-up bobbin 140 is mounted in the take-up bobbin mounting hole 113 so that the ink sheet 131 supplied from the feeding bobbin 130 is wound. In addition, the integrated cartridge 100 may further include a bobbin cover 150 covering the feeding bobbin 130 according to an aspect of the present invention.

In addition, the bobbin cover 150 may include a second opening 153, a bobbin cover guide 151, and a stepped portion 152.

The bobbin cover 150 protects the feeding bobbin 130 and forms the second opening 153 by allowing the printing medium 120 to pass between the lower portion of the feeding bobbin 130 and the upper portion of the printing medium receiving groove 111.

Both sides are made of semicircular members that are open. The bobbin cover 150 may include a lower portion and both sides are made of semicircular members that are open.

The bobbin cover guide 151 is installed on one side of the bobbin cover housing so that the printing medium 120 may move in the direction from the feeding bobbin 130 to the take-up bobbin 140 and is guided to pass between the upper surface of the medium receiving groove 111.

The stepped portion 152 is formed on the other side of the bobbin cover housing so as to be spaced apart from the upper surface of the printing medium receiving groove 111 by a predetermined distance, d1. The second opening 153 is provided so that the printing medium 120 can be moved in a direction from the feeding bobbin 130 to the take-up bobbin 140 or in the opposite direction thereof.

Printer

Figure 7:
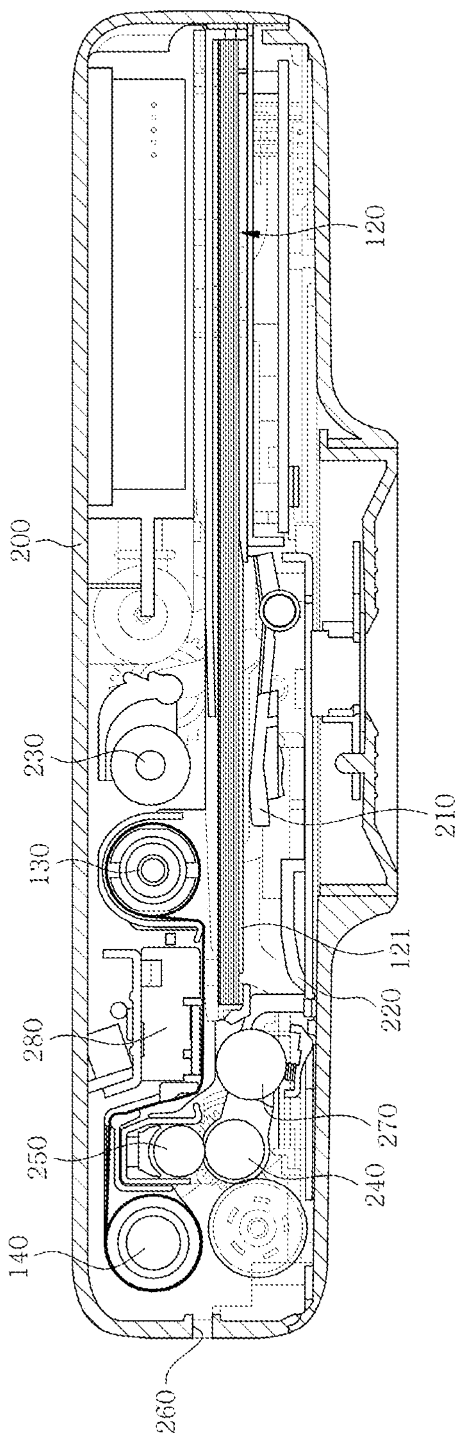
FIG. 7 is an exemplary view showing a state where the integrated cartridge according to an aspect of the present invention is applied to a printer.
Figure 8:
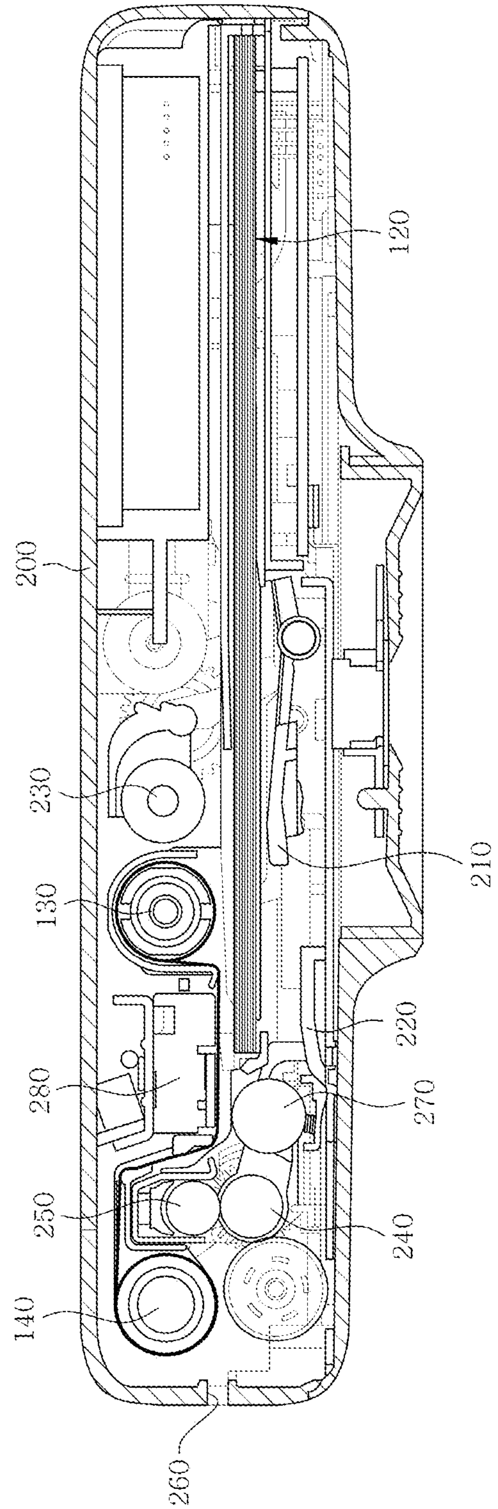
FIG. 8 is an exemplary view for explaining an operation process of the printer using the integrated cartridge according to an aspect of the present invention.
Figure 9:
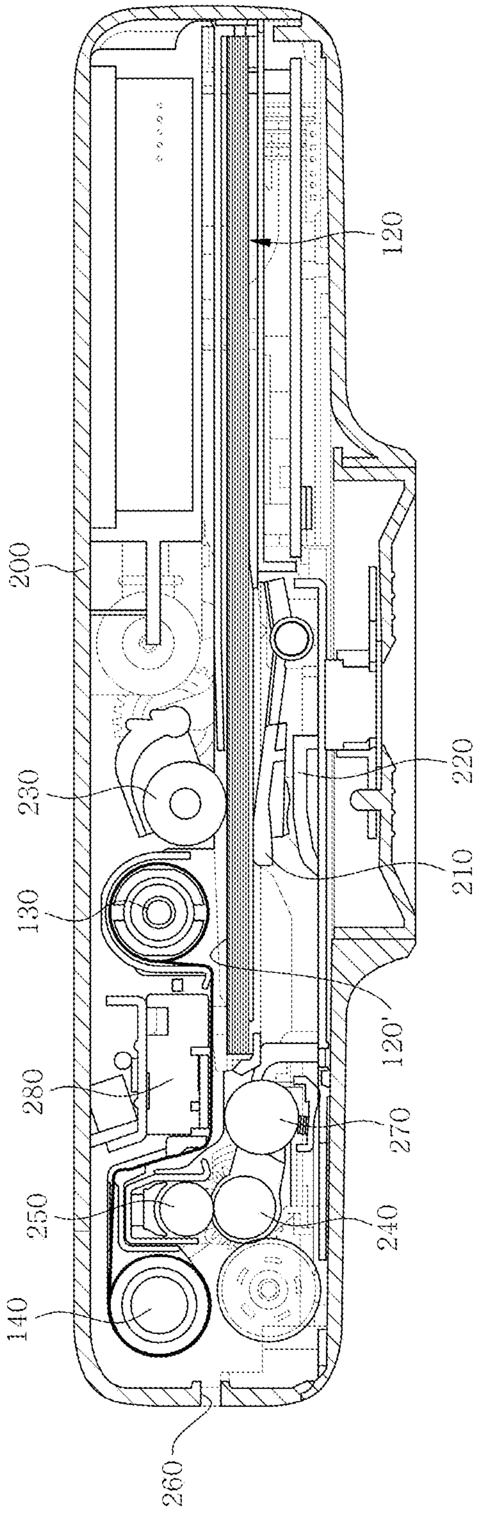
FIG. 9 is an exemplary view for explaining a pickup process of the printer using the integrated cartridge according to an aspect of the present invention.
Figure 10:
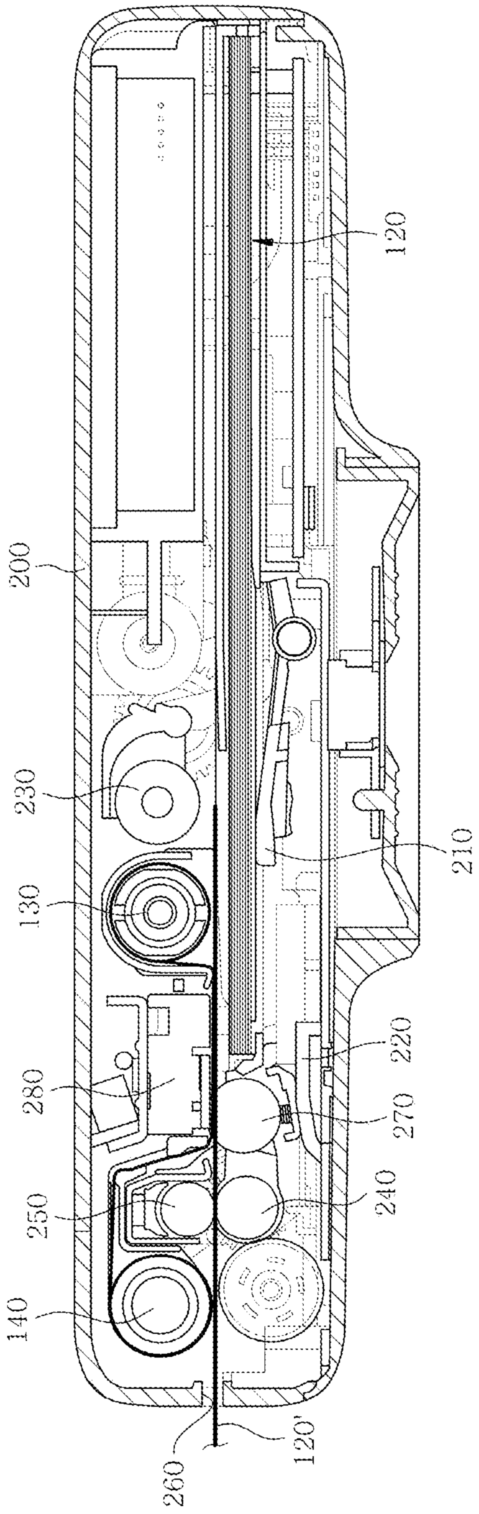
FIG. 10 is an exemplary view for explaining a printing process of a printer using the integrated cartridge according to an aspect of the present invention.
Figure 11:
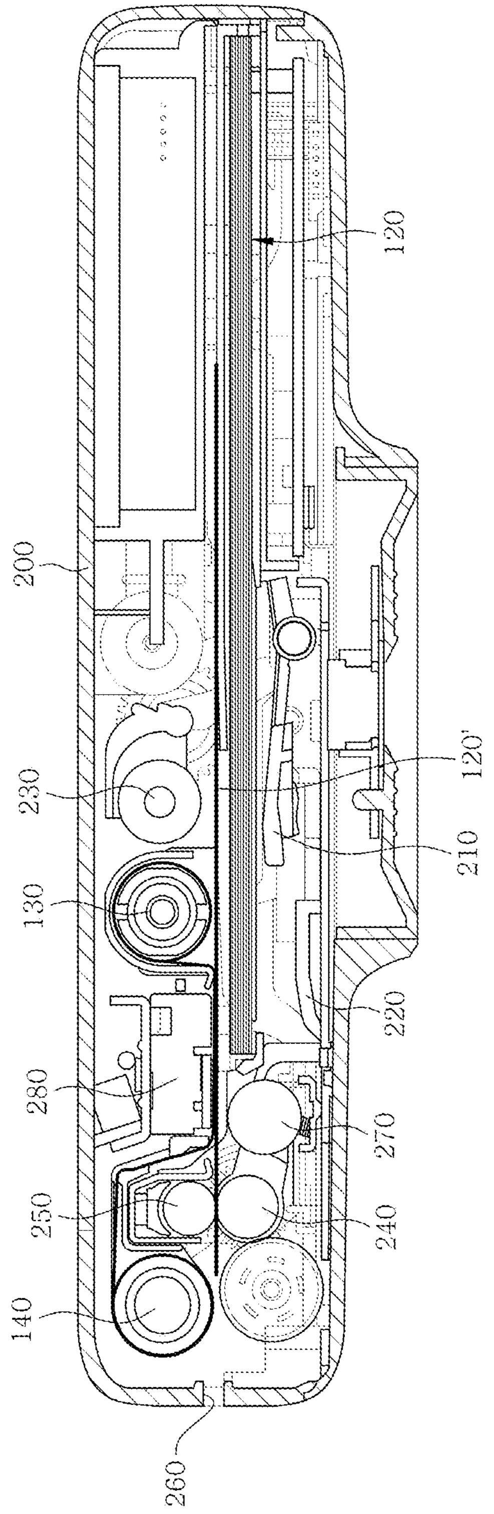
FIG. 11 is an exemplary view for explaining a process of printing a printer using the integrated cartridge according to an aspect of the present invention.
Figure 12:
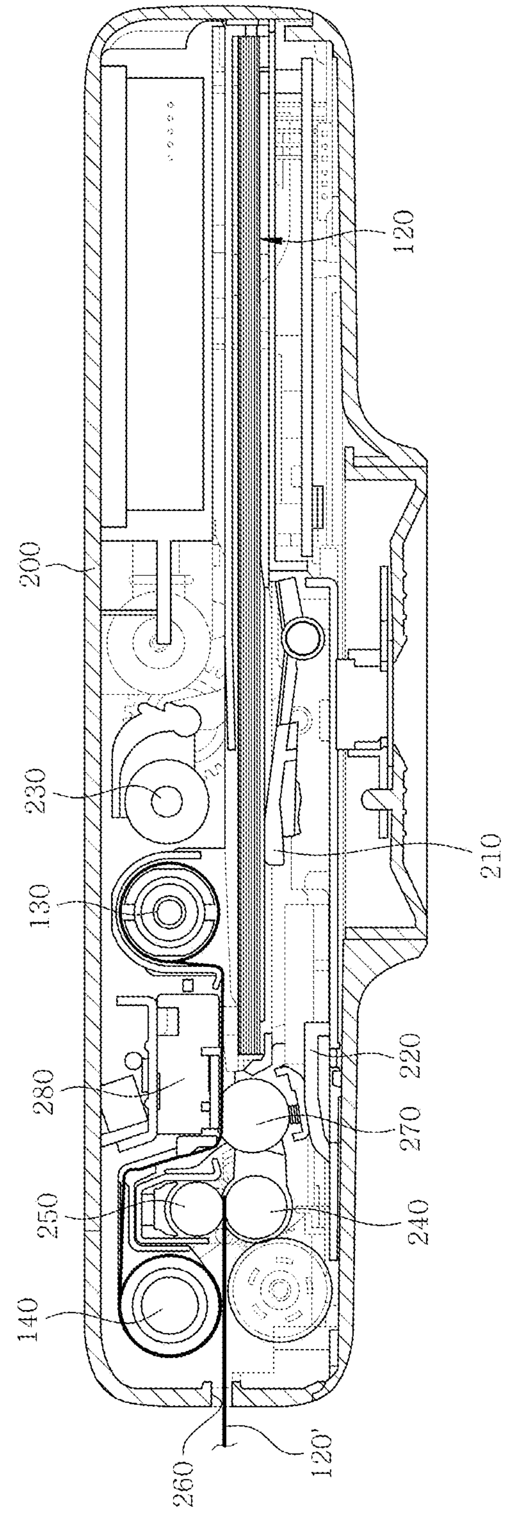
FIG. 12 is an exemplary view for explaining a process of discharging the printing medium using the integrated cartridge according to an aspect of the present invention.

FIG. 7 is an exemplary view showing a state where the integrated cartridge is applied to a printer according to an aspect of the present invention.

FIGS. 8 to 12 are views for explaining the operation of the printer using the integrated cartridge according to an aspect of the present invention, and will be described with reference to FIGS. 1 to 12.

The printer 200 may include an integrated cartridge having a printing medium receiving groove 111 in which the printing medium 120 is loaded, a cartridge housing 110 in which a feeding bobbin mounting hole 112, and a take-up bobbin mounting hole 113.

A feeding bobbin 130 mounted in the feeding bobbin mounting hole 112, and a take-up bobbin 140 mounted in the take-up bobbin mounting hole 113, and a first opening 114 is formed between the feeding bobbin 130 and the take-up bobbin for drawing out the printing medium 120 therethrough.

The printer may include a cam unit 220, a printing medium lift 210, a pickup roller 230, a capstan roller 240, a pinch roller 250, a printing medium discharge port 260, a platen roller 270, and a thermal print head 280.

In addition, on the side surface of the printer 200 is opened so that the cartridge 100 is inserted in a longitudinal direction of the feeding bobbin 130.

The printing medium lift 210 is mounted in the lower part of the printer 200 so as to be vertically movable up and down to push up a sheet paper 121 together with the pickup roller 230 so that the printing medium 120 loaded in the printing medium receiving groove 111 is discharged.

The cam unit 220 is movably installed at a lower portion of the printer 200 to load the printing medium lift 210 and the pickup roller 230, causes the medium 120' to be drawn to the first opening 114. When the printing medium 120' is moved out from the opening 114, the lift printing medium lift 210 and the pickup roller 230 are pulled down. And then, the cam unit 220 may load the capstan roller 240, the pinch roller 250 and the platen roller 270 so that the drawn printing medium 120' moved and printed in the printer.

At this time, the cam unit 220 may perform a process of sequentially performing Cyan, Magenta, and Yellow color printing operations in the course of forming the coating layer formation.

The capstan roller 240, the pinch roller 250, and the platen roller 270 are pulled up and down while repeatedly printing the printing medium 120' for the cyan, magenta, and yellow colors.

The pickup roller 230 is pulled up or pulled down by the cam unit 220 so that the printing medium 120 loaded in the printing medium receiving groove 111 is sequentially discharged.

The capstan roller 240 and the pinch roller 250 may rotate forward or reverse so that a portion of the printing medium 120' is ejected through the printing medium discharge port 260 while printing or moved inside the printer 200 for printing.

The platen roller 270 is brought into close contact with the thermal print head 280 so that the ink sheet 131 is transferred to the printing medium 120.

An operation of the printer using the integrated cartridge according to aspect of the present invention will now be described.

The integrated cartridge 100 is inserted and mounted in a longitudinal direction of the printer 200.

The printer 200 moves the cam unit 220 to cause the printing medium lift 210 and the pickup roller 230 to be loaded so that the printing medium 120' to out the first opening 114 of the printing medium receiving groove 111.

When the printing medium 120' is drawn out, the printer 200 may move the cam unit 220 so that the printing medium lift 210 and the pickup roller 230 are returned to their original positions.

The position of the ink sheet 131 is checked by loading the capstan roller 240, the pinch roller 250, and the platen roller 270, and then the drawn printing medium 120' is printed.

The printer 200 may operate the ink of the ink sheet 131 to be printed on the printing medium 120' through a thermal transfer using the platen roller 270 and the thermal head 280 and the printed printing medium 120' is moved to the printing medium discharge port 260 provided at one side of the printer 200 by using the capstan roller 240 and the pinch roller 250.

The printer 200 may reversely rotate the capstan roller 240 and the pinch roller 250 so that printing is sequentially performed in cyan, magenta, and yellow colors so that the printing medium 120' moves to the inside of the printer 200.

At this time, a distal end of the printed printing medium 120' may pass between the upper surface of the bobbin cover part 150 and the printing sheet receiving groove 111 and is drawn to the second opening 153.

At this time, the bobbin cover guide 151 may guide the printing medium 120' to pass between the bobbin cover 150 and the upper surface of the printing medium receiving groove 111.

Then, the printer 200 may operate the platen roller 270, the thermal print head 280, the capstan roller 240, and the pinch roller 250 so that the remained colors are printed on the printing medium 120'.

The printer 200 may operate the platen roller 270, the thermal head 280, the capstan roller 240, and the pinch roller 250 when the cyan, magenta, and yellow colors are printed.

Upon completion of printing, the coating layer may be further formed on the surface of the printing medium 120'.

The printing medium 120' coated with the coating layer may be discharged from the printer 200 through the printing medium discharge port 260.

Therefore, the total thickness of the cartridge can be reduced by integrating the printing medium, the feeing bobbin and the take-up bobbin together in the integrated cartridge, and the printing medium discharge port is provided between the feeding bobbin and the take-up bobbin.

It is possible to mount the feeding bobbin and the take-up bobbin to the cartridge housing, thereby simplifying the assembling process.

While the present invention has been particularly shown and described with reference to exemplary embodiments thereof, it will be understood by those of ordinary skill in the art that various changes in form and details may be made therein without departing from the spirit and scope of the invention as defined by the appended claims. And changes may be made without departing from the spirit and scope of the invention.

In the course of the description of the embodiments of the present invention, the thicknesses of the lines, the sizes of the components, and the like shown in the drawings may be exaggerated for clarity and convenience of explanation, and the above, which may vary depending on the intention or custom of the user, the operator, and the interpretation of such terms should be based on the contents throughout this specification.

| EXPLATIONS OF REFERENCE NUMBERS | |
|---|---|
| 100: cartridge | 110: cartridge housing |
| 111: printing medium receiving groove | |
| 112: feeding bobbin mounting hole | |
| 113: take-up bobbin mounting hole | |
| 114: first opening | |
| 114a: step portion | 115: pick-up roller insertion port |
| 116: ink sheet guide | 116a: first guide |
| 116b: guide groove | 116c: second guide |
| 117: handle | 120: printing medium |
| 121: sheet paper | 130: feeding bobbin |
| 131: ink sheet | 140: take-up bobbin |
| 150: Bobbin cover | 151: Bobbin cover guide |
| 152: stepped portion | 153: Second opening |
| 200: printer | 210: printing medium lift |
| 220: cam unit | 230: pickup roller |
| 240: Capstan roller | 250: Pinch roller |
| 260: printing medium discharge port | |
| 270: Platen roller | |
| 280: Thermal print head | |

What is claimed is:

1. A printer, the printer comprising:
- a pick-up roller configured to load a printing medium;
- a capstan roller;
- a platen roller;
- a printing medium lift mounted in the lower part of the printer and configured to lift the printing medium;
- a cartridge,
  - wherein the cartridge comprises:
  - a cartridge housing, which includes a printing medium receiving tray in which the printing medium is loaded;
  - a feeding bobbin on which an ink ribbon is wound,
  - a take-up bobbin for winding up the ink ribbon,
  - a first opening formed on a side of the cartridge housing and accommodated between the feeding bobbin and the take-up bobbin for guiding the printing medium to pass between the feeding bobbin and the take-up bobbin therethrough in a direction from the feeding bobbin to the take-up bobbin for feeding the printing medium from the printing medium receiving tray to a printing area; and
- a cam unit configured to install at a lower portion of the printer to pass the printing medium in the cartridge through the first opening and to print the printing medium by loading the platen roller.

2. The printer of claim 1, the printer further comprising:
- a sheet paper for supporting and protecting the printing medium loaded in the printing medium receiving tray.

3. The printer of claim 1, wherein the first opening is formed with a step portion having a predetermined height at a distal end where the printing medium is discharged.

4. The printer of claim 3, the printer further comprising:
- a sheet paper for supporting and protecting the printing medium loaded in the printing medium receiving tray.

5. The printer of claim 1, wherein the first opening having a gap for passing the printing medium is about 0.3 mm or less.

6. The printer of claim 1, the cartridge further comprising:
- a feeding bobbin mounting hole and the take-up bobbin mounting hole and configured to mount the feeding bobbin and the take-up bobbin respectively.

7. The printer of claim 6, the printer further comprising:
- an ink sheet guide provided between the feeding bobbin mounting hole and the take-up bobbin mounting hole and configured to guide the ink sheet drawn out from the feeding bobbin to be moved and wound to the take-up bobbin.

8. The printer of claim 1, the printer further comprising:
a bobbin cover configured to cover the feeding bobbin.

9. The printer of claim 8, wherein the bobbin cover has a second opening formed between a lower portion of the feeding bobbin and an upper portion of the printing medium receiving tray to allow the printing medium to pass therethrough.

10. The printer of claim 1, wherein the printing medium receiving tray is opened at a lower portion of the cartridge housing to insert the printing medium.

11. The printer of claim 1, further comprising:
- a pickup roller insertion port is provided on an upper surface of the printing medium receiving tray and at least a portion of the pickup roller insertion port is placed between the feeding bobbin and the take-up bobbin.

12. The printer of claim 1, wherein the feeding bobbin is accommodated over the printing medium receiving tray.

13. The printer of claim 1, wherein the feeding bobbin and the take-up bobbin are arranged to feed an ink sheet from the ink ribbon the same direction as feeding the printing medium through the first opening from the integrated cartridge when printing a magenta color on the printing medium.

14. A thermal printer, the thermal printer comprising:
a pick-up roller configured to load a printing medium;
a capstan roller;
a platen roller;
a printing medium lift mounted in the lower part of the thermal printer and configured to lift the printing medium;
an integrated cartridge, wherein the integrated cartridge comprises:
a cartridge housing having a printing medium receiving tray in which a printing medium is loaded,
a feeding bobbin mounting unit and a take-up bobbin mounting unit are formed,
a feeding bobbin mounted on the feeding bobbin mounting unit,
a take-up bobbin mounted on the take-up bobbin mounting unit, and
a first opening disposed between the feeding bobbin and the take-up bobbin configured to pass the printing medium therethrough in a direction from the feeding bobbin to the take-up bobbin, wherein the first opening through which the printing medium exits the printing medium receiving tray and moves into a feeding path toward a printing area; and
a cam unit configured to load the capstan roller and the pickup roller for printing the printing medium received through the first opening.

15. The thermal printer of claim 14, wherein the capstan roller and a pinch roller are configured to rotate forward and/or backward the printing medium is reciprocated and printed inside the thermal printer by forward rotation and reverse rotation.

16. The thermal printer of claim 15, wherein the printer configured to form a coating layer on a surface of the printing medium when the printing is finished and discharges.

17. The thermal printer of claim 14, wherein the feeding bobbin mounting unit is formed on at least one side of the integrated cartridge for mounting the feeding bobbin thereon, thereby the feeding bobbin being located over the printing medium receiving tray.

18. The thermal printer of claim 14, further comprising:
a pickup roller insertion port is provided on an upper surface of the printing medium receiving tray and at least a portion of the pickup roller insertion port is placed between the feeding bobbin and the take-up bobbin.

19. The thermal printer of claim 14, wherein the feeding bobbin and the take-up bobbin are arranged to feed an ink sheet from an ink ribbon the same direction as feeding the printing medium through the first opening from the integrated cartridge when printing a magenta color on the printing medium.

20. A printer, the printer comprising:
a pick-up roller configured to load a printing medium;
a capstan roller;
a platen roller;
a printing medium lift mounted in the lower part of the printer and configured to lift the printing medium; and
a cartridge,
wherein the cartridge comprises:
a cartridge housing, which includes a printing medium receiving tray in which the printing medium is loaded;
a feeding bobbin on which an ink ribbon is wound,
a take-up bobbin for winding up the ink ribbon, and
a first opening formed on a side of the integrated cartridge and accommodated between the feeding bobbin and the take-up bobbin for guiding the printing medium to pass between the feeding bobbin and the take-up bobbin therethrough in a direction from the feeding bobbin to the take-up bobbin, wherein the first opening through which the printing medium exits the printing medium receiving tray and moves into a feeding path toward a printing area.

* * * * *